United States Patent [19]
Morales

[11] 3,848,170
[45] Nov. 12, 1974

[54] CONTROL SYSTEM FOR MOTOR-GENERATOR SET

[76] Inventor: David Ocampo Morales, Benito Diaz de Gamarra nr. 37, Circuit, Oradores, Ciudad Satelite, Mexico

[22] Filed: Jan. 11, 1973

[21] Appl. No.: 322,743

[30] Foreign Application Priority Data
Oct., 1972   Mexico .............................. 139273

[52] U.S. Cl. ................................ 318/487, 219/134
[51] Int. Cl. .............................................. B23k 9/10
[58] Field of Search ............ 318/487; 219/134, 133, 219/132

[56]         References Cited
             UNITED STATES PATENTS
| | | | |
|---|---|---|---|
| 1,952,505 | 3/1934 | Landis | 219/134 |
| 2,049,377 | 7/1936 | Hobart | 219/134 |
| 2,135,045 | 11/1938 | Blankenbuehler | 219/134 X |
| 2,328,596 | 9/1943 | Winsor | 219/134 |
| 2,419,276 | 4/1947 | Miller et al. | 219/134 X |
| 2,734,116 | 2/1956 | Rybolt | 219/134 |
| 3,551,638 | 12/1970 | Campbell | 219/134 |

*Primary Examiner*—B. Dobeck
*Attorney, Agent, or Firm*—Albert L. Jeffers; Roger M. Rickert

[57]                ABSTRACT

A control system for a motor-generator set, especially wherein a high voltage source supplies the motor of the set and the generator supplies an electrode employed for soldering and welding and the like wherein a low voltage system is provided under the control of the operator manipulating the electrode and which low voltage system includes a switch on the electrode holder which is closed when the operator grasps the electrode holder and which is released when the electrode holder is released. When the switch is closed, the supply of power is initiated to the motor and when the switch is released a time delay period starts running at the end of which the supply of power to the motor is interrupted.

1 Claim, 1 Drawing Figure

PATENTED NOV 12 1974          3,848,170
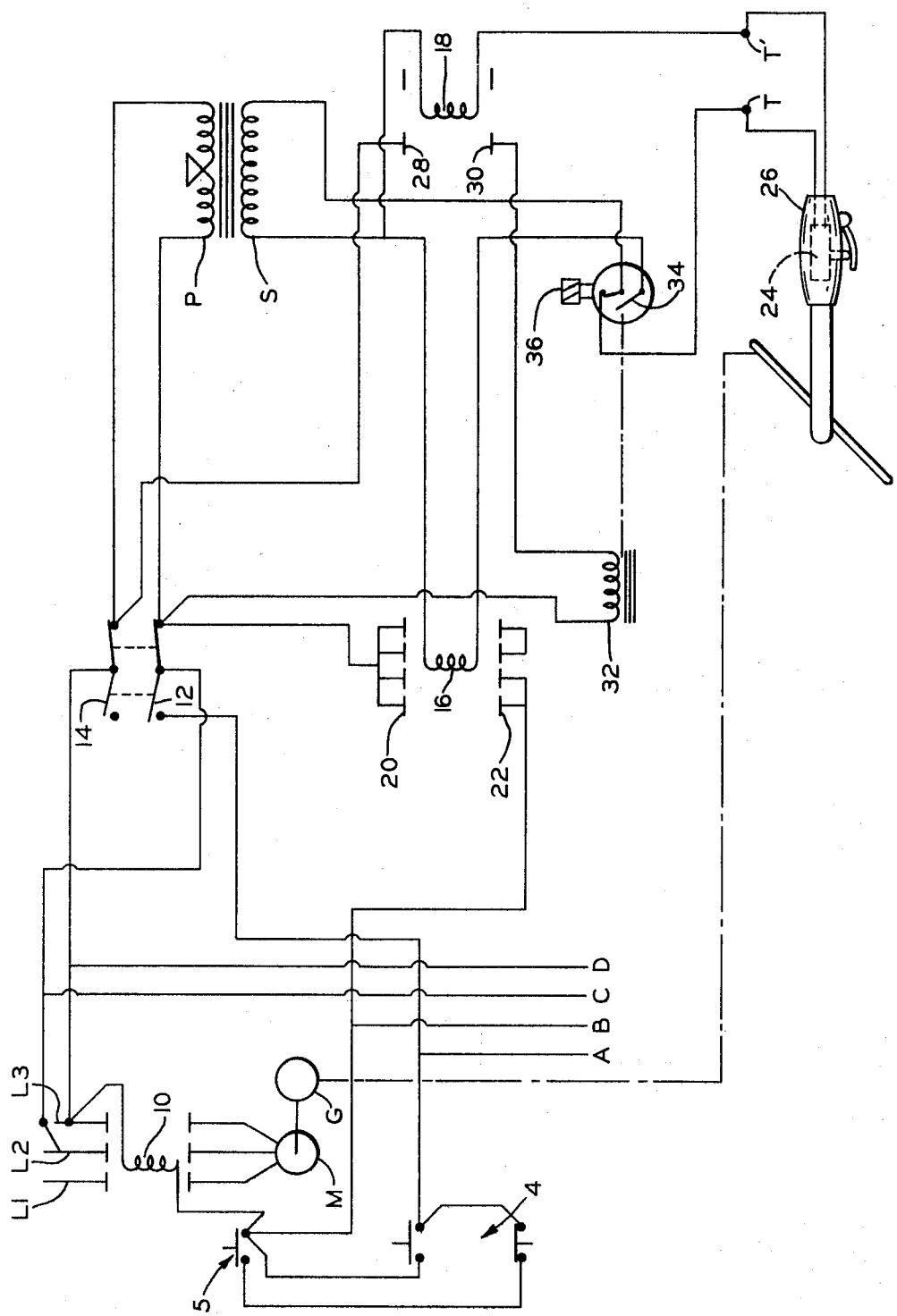

CONTROL SYSTEM FOR MOTOR-GENERATOR SET

The present invention relates to control systems, especially for motor-generator sets employed in connection with soldering and welding operations and the like.

Motor-generator sets of the nature referred to are widely used. The work operations performed in soldering and welding and the like are generally discontinuous, and it is disadvantageous for the motor to be supplied with power continuously because a great deal of the power supply to the motor is wasted, namely, during the time that a work operation is not being performed.

It has been proposed to provide a control system which will initiate the power supply to the motor when the operator grasps the electrode holder to initiate a work operation and interrupt the power to the motor when the operator releases the electrode. Such releasing of the electrode might be occasioned by the necessity of moving the workpiece or the like and could represent only a temporary interruption in the work operation.

The aforementioned system works satisfactorily for interrupting the power supply to the motor when the work operation is interrupted, but many times the interruption of the work operation is merely for a brief period of time and, under these circumstances, the starting and stopping of the motor can represent a waste of power as well as imposing extra mechanical loads on the motor and generator.

Having the foregoing in mind, a particular object of the present invention is the provision of a control system of the general nature described above but which includes an arrangement for delaying the time at which the motor is deenergized following the releasing of the electrode holder.

A further object of the present invention is the provision of a control system of the nature referred to which is adapted for incorporation in new manufacture as well as in existing equipment.

Still another object is the provision of a control circuit of the nature referred to in which the time delay is adjustable to accommodate the system to the particular type of work operation being carried out.

The foregoing objects as well as other objects and advantages of the present invention will become more apparent upon reference to the accompanying drawing taken in connection with the following detailed specification.

BRIEF SUMMARY OF THE INVENTION

According to the present invention, a contactor is interposed between a high voltage power source and the motor of a motor-generator set. A relay is provided for controlling the supply of energy to the coil of the contactor and the relay has a coil which, in turn, is adapted for being supplied from a low voltage source. The low voltage source for the secondary of a transformer has a primary side connected to the high voltage source.

The supply of energy to the relay is under the control of a control relay having a coil connected across the secondary of the transformer and in series with a manual switch on the electrode holder. The electrode in the holder is supplied by the generator of the motor-generator set. There is, furthermore, a timer having a blade which closes when the switch is closed by the operator and which blade is also in circuit with the coil of the relay.

The timer blade is adapted for remaining closed after the operator releases the switch for a predetermined adjustable time delay so that momentary interruption of the work cycle, during which time the operator releases the switch on the electrode holder will not be accompanied by an interruption of power to the motor of the motor-generator set.

DETAILED DESCRIPTION OF THE INVENTION

Referring to the drawing somewhat more in detail, wires L1, L2 and L3 represent incoming high voltage electric power supply lines which are connected to one set of contacts of a contactor having an actuating coil 10. The other set of contacts are connected to a motor M which is, in turn, connected to drive a generator G. Energization of coil 10 will cause contacts to close and energize the motor.

Power lines L2 and L3 are connected by respective wires with blades 12 and 14 respectively of a manual tilt switch which, in the position illustrated, connects the lines L2 and L3 to opposite ends of the primary P of a transformer having a low voltage secondary S. One side of the secondary S is connected to one end of the coil 16 of a relay and also to one end of the coil 18 of a further control relay.

Relay 16 has blades 20 and 22 which close when coil 16 is energized and which are in circuit between blade 12 and one end of coil 10, the other end of which is connected to power line L3. It will be evident that energization of coil 16 will result in energization of coil 10.

Coil 18 has the end thereof opposite secondary S connected to a terminal T' and which is connected to one side of a switch 24 carried by electrode holder 26 and adapted for being closed when the operator grasps the electrode holder. The other side of switch 24 is connected to a terminal T which, in turn, is connected back to the other side of secondary S. At this point, it will be seen that closing of switch 24 by grasping of the electrode holder 26 will lead to energization of coil 18.

Coil 18 controls blades 28 and 30 which close when coil 18 is energized and complete a circuit from blade 14 through blades 28 and 30 and the coil 32 of a timer back to blade 12. Coil 32 of the timer controls a normally open blade 34 which closes when coil 32 is energized and which is adapted to open following a predetermined time delay after coil 32 is deenergized. Adjusting element 36 is provided for controlling the duration of the aforementioned time delay.

Blade 34 is connected in circuit with coil 16 and the secondary S of the transformer so that when blade 34 closes coil 16 will be energized.

For conventional manual operation of the motor-generator set blades 12 and 14 can be tilted away from the position in which they are illustrated and in which case the switches generally indicated at 4 and 5 at the left side of the drawing will be operative for controlling the energization of coil 10. Remote control means can also be provided connected to the wires A, B, C and D in a conventional manner.

From the foregoing, it will be perceived that, with switch blades 12 and 14 tilted to the illustrated position, energization of motor M will come about by closing of switch 24 on the electrode holder and deenergization of motor M will take place at the end of a predetermined time delay following opening of switch 24. Momentary interruptions of the work cycle are, thus, not accompanied by stopping of the motor of the motor-generator set so that more efficient operating conditions prevail and there is less wear and tear on the motorgenerator set from starting and stopping and likewise fewer surges imposed on the high voltage power lines supplying the motor.

Modifications may be made within the scope of the appended claims.

What is claimed is:

1. In a control system for a motorgenerator set: a high voltage system for energizing said motor, a low voltage system for controlling the connection of said high voltage system to said motor and including a manual switch, said manual switch being operable upon actuation to connect said high voltage system to said motor, and time delay means operable upon release of said manual switch to maintain the connection of said high voltage system to said motor for a predetermined period of time; said high voltage system comprising a source of power, a first contactor between said source and said motor and having a first coil operable when energized to connect said source to said motor, a second contactor having a second coil operable when energized to cause energization of said first coil, a step down transformer having a primary side connected to said source and having a secondary side, said low voltage system including said secondary side of said transformer, said time delay means comprising a timer having a blade between said second coil and the secondary side of said transformer operable when closed to connect said secondary side of the transformer to said second coil, said timer having a coil operable when energized to close said blade, means for causing said blade to remain closed for a predetermined time after said timer coil is deenergized, a third contactor connected to said timer coil and having a third coil operable when energized to cause energization of said timer coil, and said manual switch being connected to said third coil and operable when actuated to cause energization of said third coil.

* * * * *